J. J. VOORHEES, Jr.
INNER TUBE FOR PNEUMATIC TIRES.
APPLICATION FILED MAY 18, 1917.
1,336,173. Patented Apr. 6, 1920.
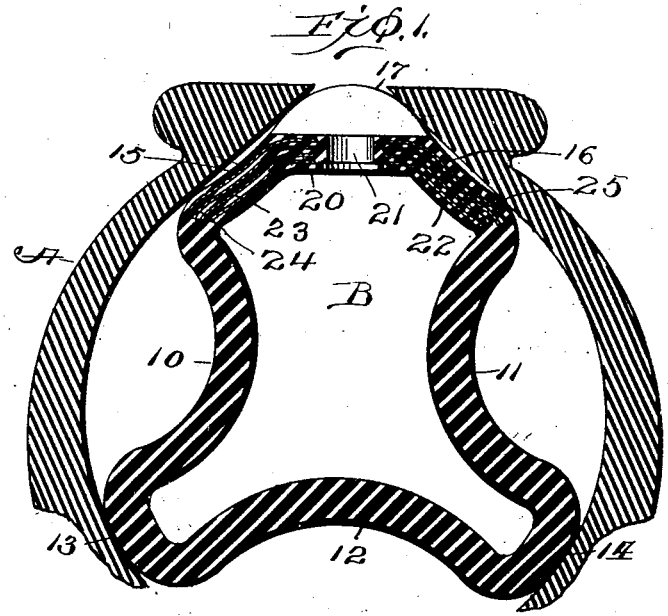
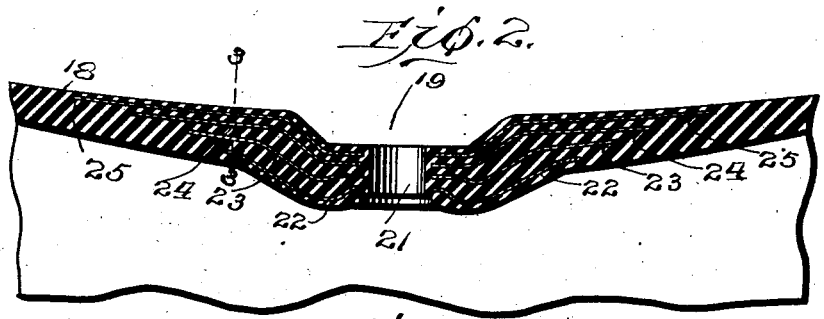
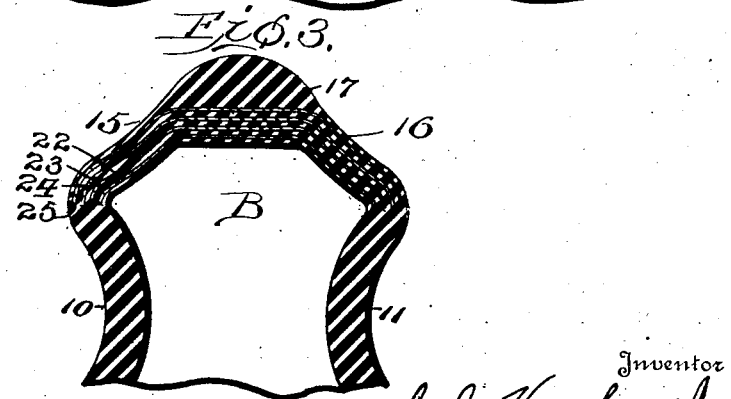

UNITED STATES PATENT OFFICE.

JOHN J. VOORHEES, JR., OF JERSEY CITY, NEW JERSEY, ASSIGNOR, BY MESNE ASSIGN-
MENTS, TO U. S. COMPRESSION INNER TUBE COMPANY, OF TULSA, OKLAHOMA, A
CORPORATION OF DELAWARE.

INNER TUBE FOR PNEUMATIC TIRES.

1,336,173.  Specification of Letters Patent.  Patented Apr. 6, 1920.

Application filed May 18, 1917. Serial No. 169,522.

*To all whom it may concern:*

Be it known that I, JOHN JAY VOORHEES, Jr., a citizen of the United States, residing at Jersey City, in the county of Hudson and State of New Jersey, have invented certain new and useful Improvements in Inner Tubes for Pneumatic Tires, of which the following is a specification.

This invention relates to inner tubes for pneumatic tires. It is well known that if inner tubes are run while in a deflated condition such an endwise pull is imparted to them as to tear the valve stems loose from the tubes, it being understood that the valve stem is held against movement with the tube by being passed through the felly and rim of the wheel to which the tire is applied.

It is a primary object of the present invention to provide a tube constructed in such manner that it will not have its valve stem torn out, if for any reason it is run in a deflated condition. This object is accomplished in a two-fold manner. First, by constructing the tube in such a way that the valve stem receiving portion thereof, is brought out of alinement with, or off-set from the general inner peripheral rim engaging portion of the tube and, second by embedding reinforcing layers of canvas in the material of the tube, said layers being of varying lengths and being so arranged as successively to take up any longitudinal strain caused by the tube being run in a deflated condition.

A further object of the invention is to provide a tube as above set forth, having its rim engaging portion so constructed that while the rim engaging portion of the tube will be, in a measure, anchored with respect to the inclosing casing to thereby preserve the proper relation of the tube and casing during the application of the tire to the wheel, said tube will be capable of a limited shifting to permit equalization of the compression when the improvements are embodied in what are known as compression inner tubes, i. e. inner tubes, the material of which is placed under compression when the tube is inflated to thereby render the tube self-healing if punctured.

Further objects and advantages of the invention will be set forth in the detailed description which now follows.

In the accompanying drawings

Figure 1 is a transverse sectional view through an inner tube and its casing, said inner tube being constructed in accordance with the invention.

Fig. 2 is a fragmentary longitudinal sectional view through the tube at the valve stem receiving portion thereof, and Fig. 3 is a partial transverse sectional view taken upon line 3—3 of Fig. 2.

Like characters of reference designate corresponding parts in all of the figures of the drawing.

Referring to the drawing, A designates a tire casing of the usual form and B designates the inner tube thereof.

I preferably embody the improvements in a tube having continuous annular depressions 10 and 11 in its opposite sides and a continuous annular depression 12 in its tread. The depression 12 preferably extends substantially across the entire tread portion of the tube and is connected to the depressions 10 and 11 by bearing surfaces 13 and 14 which preferably form annular outwardly projecting looped portions, for contact with the inner wall of the casing. The depressions 10 and 11 are separated from each other at the rim side of the tire by bearing portions, which include walls 15 and 16 and which are oppositely inclined and lie against the casing at the rim side of the latter.

These walls, in a measure, anchor the tube in proper relation to the casing, but in order that such necessary slight movement may take place as to best equalize the compression throughout the material of the tube, the rim engaging portion is rounded or curved at 17. While I have thus illustrated and described a compression inner tube with which my valve stem protecting and reinforcing features are employed, it will be apparent that my method of protecting the valve stem is of value in any type of inner tubes. In carrying out the invention I transversely recess or cut out the inner peripheral rim engaging part 18 of the tube as indicated at 19 in Fig. 2 and I add enough rubber at 20 upon the inner side of the part 18 to build up the tube as much or slightly more than it is recessed at 19. It will, therefore, be seen that I maintain the necessary thickness of the tube, but that I bring the valve stem receiving opening 21 out of longitudinal alinement with the part 18, or in other words, that the valve stem receiving opening is formed in an off-set portion of the tube. In addition to forming this off-set, as described, I embed in the material of the tube, about the valve stem receiving opening 21, layers of canvas or other reinforcing material 22, 23, 24 and 25, each successive layer being slightly longer than the layer preceding it. As is illustrated in Fig. 1, all of these layers terminate transversely at approximately the same part of the tube, namely, at the beginning of the side depressions, but the exact width of these layers and the exact point of their termination is immaterial since they are designed to resist longitudinal rather than lateral strain.

If a tube formed as above described is run in a deflated condition the tendency of the tube is to crease and fold circumferentially of the wheel which results in imposing a very considerable longitudinal pull upon the inner peripheral portion of the tube. In my construction this pull is first taken up by the increased thickness of rubber and then successively taken up by the reinforcing strips 25, 24, 23 and 22. This in addition to the transferring of the strain from one longitudinal center to another longitudinal center so reduces the ultimate pull upon the valve stem as to prevent the valve stem from being torn loose from the tube.

It is to be understood that the invention may be embodied in other forms than that herein shown which is merely illustrative and that it includes within its purview such modifications as come within either the spirit or the terms of the appended claims.

Having described my invention what I claim is:—

1. An inner tube for pneumatic tires, having its valve carrying portion off-set from the remainder of the tube.

2. An inner tube for pneumatic tires, having its valve carrying portion off-set from the remainder of the tube, said off-set portion having a reinforcing member therein which extends through the off-set portion and into the undistorted body portion of the tube.

3. An inner tube for pneumatic tires having a molded off-set valve portion, said off-set portion having a plurality of reinforcing members embedded therein and extending through the off-set portion and following the contour of the tube wall into the undistorted portion of the tube.

4. An inner tube for pneumatic tires, having its valve carrying portion off-set from the remainder of the tube, said off-set portion having a plurality of reinforcing members of varying lengths embedded therein which extend through the off-set portion and into the undistorted portion of the tube.

5. An inflatable tube for pneumatic tires, recessed at its inner peripheral side and thickened opposite said recessed portion to constitute an off-set valve carrying portion.

6. An inflatable tube for pneumatic tires, recessed at its inner peripheral side and thickened opposite said recessed portion to constitute an off-set valve carrying portion, and a reinforcing element embedded in said thickened portion and extending through said thickened portion into the normal undistorted portion of the tube.

7. An inflatable tube for pneumatic tires, recessed at its inner peripheral side and thickened opposite said recessed portion to constitute an off-set valve carrying portion, and a plurality of reinforcing webs of fabric embedded in and through said thickened portion into the undistorted portion of the tube.

8. An inflatable tube for pneumatic tires, recessed at its inner peripheral side and thickened opposite said recessed portion to constitute an off-set valve carrying portion, and a plurality of reinforcing webs of fabric of varying lengths embedded in said thickened portions and extending beyond the recessed portion of the tube.

9. An inner tube for pneumatic tires having a valve section provided with a plurality of reinforcing members embedded entirely within the main body of the tube, and terminating at different points, in the length thereof, the number of reinforcing members decreasing at cross sections taken at points successively from the center of the valve section and in the length of the tube.

10. An inner tube for pneumatic tires having a valve section provided with a plurality of reinforcing members of graduated dimensions embedded entirely within the main body portion of the tube.

In testimony whereof I affix my signature in the presence of two witnesses.

JOHN J. VOORHEES, Jr.

Witnesses:
  CLARENCE F. HOSKINS,
  FRED B. PELLINGTON.